United States Patent
Tsiao et al.

(10) Patent No.: US 7,216,080 B2
(45) Date of Patent: May 8, 2007

(54) NATURAL-LANGUAGE VOICE-ACTIVATED PERSONAL ASSISTANT

(75) Inventors: James Chi-Shun Tsiao, Santa Clara, CA (US); David Yinkai Chao, Los Altos, CA (US); Peter P. Tong, Mountian View, CA (US)

(73) Assignee: Mindfabric Holdings LLC, Cincinatti, OH (US)

( * ) Notice: Subject to any disclaimer, the term of this patent is extended or adjusted under 35 U.S.C. 154(b) by 477 days.

(21) Appl. No.: 09/964,947

(22) Filed: Sep. 26, 2001

(65) Prior Publication Data

US 2002/0040297 A1 Apr. 4, 2002

Related U.S. Application Data

(60) Provisional application No. 60/236,650, filed on Sep. 29, 2000.

(51) Int. Cl.
*G10L 15/18* (2006.01)
*G10L 21/00* (2006.01)

(52) U.S. Cl. ..................... 704/257; 704/275
(58) Field of Classification Search ............ 704/235, 704/260, 257, 246, 275
See application file for complete search history.

(56) References Cited

U.S. PATENT DOCUMENTS

| | | | |
|---|---|---|---|
| 5,602,963 A | | 2/1997 | Bissonnette et al. |
| 5,625,814 A * | | 4/1997 | Luciw ............. 707/5 |
| 6,009,398 A | | 12/1999 | Mueller et al. |
| 6,144,938 A * | | 11/2000 | Surace et al. ......... 704/257 |
| 6,282,507 B1 * | | 8/2001 | Horiguchi et al. ..... 704/3 |
| 6,377,913 B1 * | | 4/2002 | Coffman et al. ...... 704/8 |
| 6,434,520 B1 * | | 8/2002 | Kanevsky et al. ..... 704/243 |
| 6,510,412 B1 * | | 1/2003 | Sasai et al. ........ 704/257 |
| 6,526,382 B1 * | | 2/2003 | Yuschik ............ 704/275 |
| 6,658,389 B1 * | | 12/2003 | Alpdemir .......... 704/275 |
| 6,665,640 B1 * | | 12/2003 | Bennett et al. ...... 704/257 |
| 6,701,294 B1 * | | 3/2004 | Ball et al. ......... 704/257 |
| 6,757,718 B1 * | | 6/2004 | Halverson et al. ..... 709/218 |
| 2001/0037328 A1 * | | 11/2001 | Pustejovsky et al. .... 707/3 |

FOREIGN PATENT DOCUMENTS

| | | |
|---|---|---|
| EP | 1 037 463 A2 | 9/2000 |
| EP | 1 079 371 A1 | 2/2001 |
| WO | WO 00/11571 | 3/2000 |

* cited by examiner

*Primary Examiner*—David Hudspeth
*Assistant Examiner*—Matthew J Sked
(74) *Attorney, Agent, or Firm*—Dergosits & Noah LLP; Todd A. Noah

(57) ABSTRACT

A handheld personal assistant including a voice-recognizer and a natural-language processor is disclosed. The recognizer is configured to transform a verbal expression from a person into a different mode of information (e.g., text). The natural-language processor is configured to process the mode of information to extract, from a database, a piece of information that is personal to the person. In processing, the processor analyzes the expression grammatically and semantically to transform at least a part of the mode of operation into at least one instruction. This piece of information can be a to-do list, information in the person's calendar or information from the person's address book, such as a phone number. The processor can still extract the piece of information when the person declares the expression differently.

12 Claims, 2 Drawing Sheets

NATURAL-LANGUAGE VOICE-ACTIVATED PERSONAL ASSISTANT

CROSS REFERENCE TO RELATED APPLICATIONS

The application claims benefit of U.S. Provisional Patent Application No. 60/236,650, filed Sep. 29, 2000, and entitled "NATURAL-LANGUAGE VOICE-ACTIVATED PERSONAL ASSISTANT," which is hereby incorporated herein by reference.

BACKGROUND OF THE INVENTION

The present invention relates generally to personal assistant and more particularly to natural-language voice-activated personal assistant.

For the past few years, personal assistants have been growing at a phenomenal rate. Several companies, including Palm, Inc. and Handspring, Inc., have successfully entered the market. Their products enhance personal productivity to a certain degree. These personal assistants are computing devices and thus also referred to as "digital assistants." However, such assistants have weaknesses.

Typically, such assistants are handheld, meaning that they can be held in one's hand or put in a shirt pocket. As time goes by, handheld can even imply a little badge on one's shirt, which sometimes can be referred to as an Internet appliance or wearable computer. These assistants are typically quite small with very small keyboards. As a result, it is not only tedious but also time consuming to interact with such assistants.

One way to attempt to get around the interaction problem is to include a voice-recognition mechanism in the assistant. IBM recently announced that they are contemplating incorporating voice-recognition mechanisms into personal assistants. There are also cellular phones where you can use key words verbally to access phone numbers. However, the key words have to match the names you previously stored in the phone.

Voice-recognition alone is insufficient to solve the interaction problem. Humans can express an idea in so many different ways. For example, after recording his meeting time with Alice into the calendar of an assistant, Joe wants to find out the time of the meeting. He can ask for the information in many ways. Joe may ask, "When is my meeting time with Alice?", "When should I be meeting Alice?", "Damn! Should I be meeting Alice tomorrow?" or "Tell me when is Alice meeting me." Clearly, voice-recognition alone is not sufficient to resolve the different ways of expression and retrieve Joe's meeting time with Alice.

Another issue involved is that human expression can be ambiguous in other ways. For example, Joe can ask, "Meeting Alice?" or "When to meet Alice?". Such expressions are ambiguous and, strictly speaking, are syntactically incorrect. But the assistant should be able to retrieve the meeting time for Joe, just like a good human assistant can. Such different or ambiguous expressions are common in everyday conversation, and should be expected when one is using his personal assistant to get phone numbers, retrieving to-do list or looking up calendar events.

It should be apparent from the foregoing that voice-recognition software alone is insufficient to make personal assistants or cell phones applicable for common everyday expressions.

SUMMARY OF THE INVENTION

The present invention provides a personal assistant that understands human expressions to retrieve information for a person. In one embodiment, the personal assistant is a handheld computing device, which can also be referred to as a "digital assistant." For example, James can be asking for David's phone number in many different ways, such as "Let me have David's phone number.", "What is David's phone number?" or "David's phone number, please." Through the present invention, the personal assistant can still extract the phone number for David. If there is more than one David in the address book, the assistant can ask James to resolve the ambiguity. For example, the assistant can ask James, "Are you asking for David Chaos or David Tsunami?" Depending on the response, the assistant can access the phone number.

In one embodiment, a handheld personal assistant includes a voice-recognizer and a natural-language processor. The voice-recognizer can transform an expression received from a person (i.e., user) into a different mode of information. This mode can be text or other non-waveform representation.

In another embodiment, the recognizer can be previously trained to recognize the person's voice, but not another person's voice. Based on the person's voice, the assistant can only allow the person to access information that is personal to the person.

The natural-language processor can process the mode of information to extract, from a database, a piece of information that is personal to the person. The natural-language processor can still extract the piece of information even when the person declares the expression differently, or even if the expression is ambiguous. If the assistant cannot resolve an ambiguity in the expression, the assistant can provide the person with a number of alternatives to resolve the ambiguity or otherwise ask or seek clarification.

In processing, the natural-language processor can analyze the expression grammatically and semantically to transform at least a part of the expression into at least one instruction.

The piece of information can be a personal address book, a to-do-list or a calendar. The piece of information can depend on the context under which the person made the expression, and the expression can be just one word.

The handheld personal assistant can also include a display to display the piece of information. In another embodiment, the assistant can include a voice synthesizer, or more commonly known as a speech synthesizer, to transform the piece of information into sound to communicate to the person.

In one embodiment, the piece of information was entered into the assistant by the user. The piece of information can be entered through use of a keypad or keyboard or through voice. The assistant can further include a categorizer that stores the piece of information into the database. To assist the categorizer, the person can identify a category.

In another embodiment, the assistant has a receiver to receive expressions and a transmitter to transmit information to a second system. This transmission can be done wirelessly. The expressions can be transformed into a different mode of information either by the assistant, by the second system, or a combination of the two. It would then be up to the second system to process the mode of information to extract, from a database, a piece of information that is personal to the person. After extraction, the second system transmits the piece of information back to the handheld personal assistant.

Other aspects and advantages of the present invention will become apparent from the following detailed description, which, when taken in conjunction with the accompanying drawings, illustrates by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
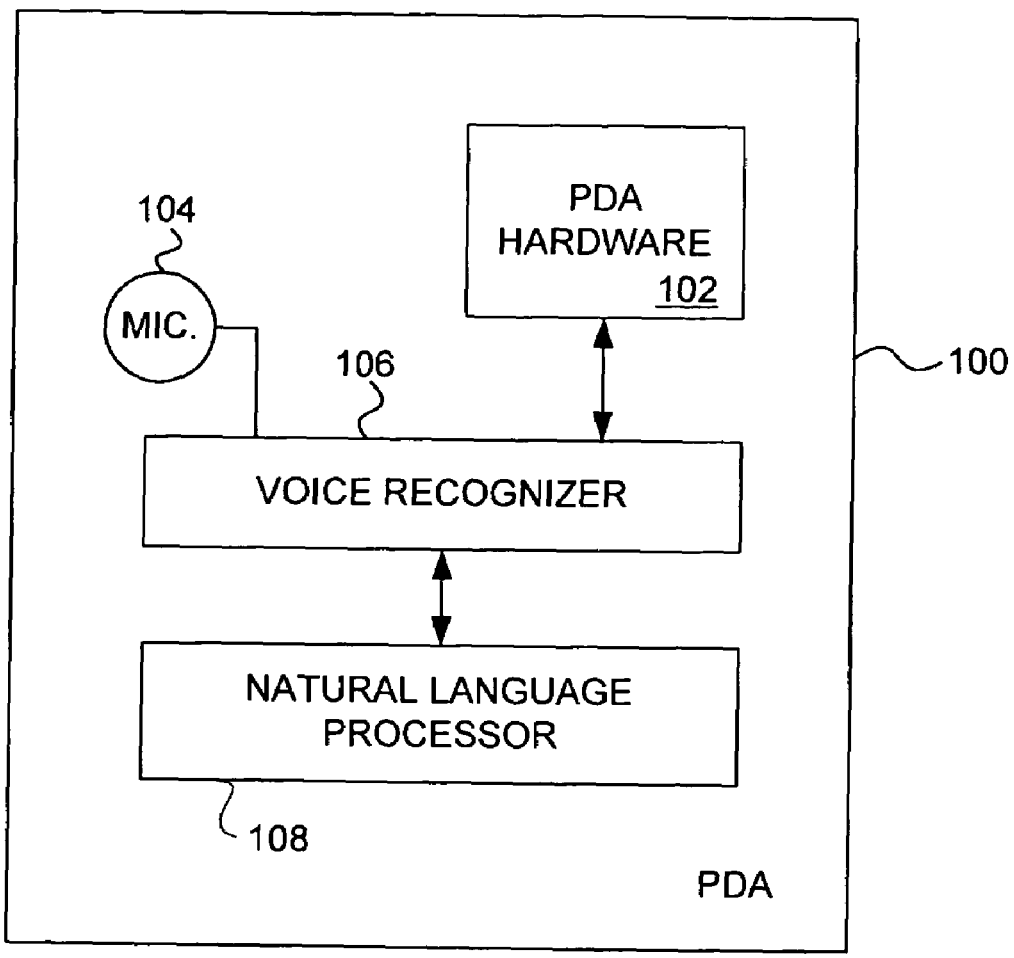
FIG. 1 is a block diagram of a personal digital assistant according to one embodiment of the invention.

One embodiment of the invention includes a handheld personal assistant with a voice recognizer and a natural-language processor. In the following description, the voice recognizer is user-dependent; however, the invention can also be applicable to a user-independent recognizer.

After getting the handheld personal assistant, a person (i.e., the user) trains the voice recognizer to recognize his voice. This can be done through reading a piece of predetermined text to the assistant, as in IBM's ViaVoice product line. After reading the piece of text, the assistant is programmed to recognize the user's voice. For some products in the market place, the accuracy of voice recognition can then be more than 95%.

After the training, the recognizer will be geared to recognize the user's voice, but not another person's voice. The user can then, for example, ask for the time of his meeting with Joe tomorrow. The voice-recognizer can transform this expression into a different mode of information, for example, text. Based on the person's voice, the assistant can allow the user to access the piece of information that is personal to him.

In one embodiment, the assistant obtains a context from the user query. This can either be a direct context request or an inferred context. For example, the user can directly say one of the following three options: Calendar, Address Book, or To-do list. Alternatively, the assistant can determine context based on the query. For example, a request for a phone number would place the assistant into the address book context. The assistant will prompt the user for clarification if a context is ambiguous.

Once a context is established, the context is maintained through the session or until the user requests another context, either directly or indirectly. For example, if the user requests the following: "What is the phone number for Joe?", this will place the assistant into Address Book context. If he follows up with "Tom?", the assistant will retain the most recent context (Address Book, a request for phone number) and apply it to the search for Tom. As an example of indirectly changing context, again if the user asks the phone number of Joe, after getting the response, the user can subsequently asks, "Any meeting with him?" This can switch the context for the assistant from phone book to calendar, while keeping certain relevant information in the original question, in this case, "Joe". The two questions can be in the same session, and "him" in the second question is replaced by the word, "Joe", to get the answer for the question.

The natural-language processor can process the mode of information to extract, from a database, a piece of information that is personal to the person. In one embodiment, the assistant can use some of the natural-language processing methods described in U.S. patent application Ser. Nos. 09/347,184, filed Jul. 2, 1999 (now U.S. Pat. No. 6,501,937) and 09/387,932, filed Sep. 1, 1999, (now U.S. Pat. No. 6,498,921) which are incorporated herein by reference.

In processing, the processor can analyze the expression grammatically and semantically to transform at least a part of the expression into at least one instruction. In one embodiment, the instruction can be a query to a database. For example, the processor transforms the expression into a SQL query to search for information in the database.

In another embodiment, the processor transforms the expression into question structures and question formats. The question formats can then be transformed into instructions to retrieve information. To explain in more detail, each phrase in the expression can be linked to a category, and the categorized representation of the expression can be known as a question structure. In other words, a question structure can be a list of categories. For example, the question structures of the expression, "cash cow" can be "finance" "animals" and just "finance" if the expression is considered as one single phrase. In this example, the expression, "Cash cow?" is linked to two question structures. After the question structures representing the expression have been selected, one or more question formats can be identified. Each question format can be a pre-defined question with one or more phrases and one or more categories. The following can be a question format:

What is "name" "phone number"?

The expression, "What is Joe's phone number?", falls under the above question format.

Each category in a question format has a number of corresponding phrases. For example, the corresponding phrases of the category "name" can include all of the names in the directory of the database. After the identification of the question format, the processor can transform it into instructions. In one situation, the instruction can be database queries.

The processor can still extract the piece of information even when the user declares the expression differently, or even if the expression is ambiguous. If the assistant cannot resolve an ambiguity in the expression, the assistant can provide the user with a number of alternatives to resolve the ambiguity. For example, the user may be given the alternatives to pick between Joe Smith and Joe Winter.

The piece of information can be associated with a personal address book, a to-do-list or a calendar. The piece of information can depend on the context under which the person made the expression, and the expression can be multiple words or just one word.

The handheld personal assistant can also include a display to display the piece of information. In another embodiment, the assistant can include a voice synthesizer, or more commonly known as a speech synthesizer, to transform the piece of information into sound to communicate to the person.

In one embodiment, the piece of information was entered into the assistant by the user. The piece of information can be entered through use of a keypad or keyboard or through voice. The assistant further includes a categorizer that stores the piece of information into appropriate areas in the database. To assist the categorizer, the person can identify a category. This can be done, for example, by declaring the following, "Entering new information into the address book." The natural-language processor will know that the next expression is particularly for entering information into the address book. The user can then declare, "Joe Montani's phone number is 650-1234567." As explained in U.S. patent application Ser. No. 09/496,863, filed Feb. 2, 2000, (now U.S. Pat. No. 6,571,240) which is hereby incorporated by reference, after identifying the category an input belongs to, the input can be linked to that category. Similarly, in the present situation, the categories can be the "name" and the "phone number" categories. After identifying both of them by the natural-language processor, the categorizer places "Joe Montani" into the "name" category, and "650" into the "area code" section and "1234567" into the "main phone number" section of the "phone" category. As in requesting for information, selecting context for entry can also be done indirectly. For example, the user declares, "Joe's phone number is 1234567. Then he states, "Meeting with him at 5 pm tomorrow." The context for the second piece of information can be switched from address book to calendar. Again certain information in the first entry can be retained for the second entry to resolve ambiguity in the second entry, which in this case is the name, "Joe".

Input of information and retrieval of information can be considered contexts, therefore, they can be switched like other contexts, either by direct requests or inferred from the question. In one embodiment, after the user has entered the information, he can explicitly request an end of the context by declaring, for example, "I have finished entering new information." In another embodiment, the user may indirectly switch context by making a query, thus switching to the information retrieval context. Later, when the user needs Joe Montani's phone number, he can ask, "Let me have Joe Montani's phone number". In another embodiment, he can set the context of "address book" before asking for Joe Montani's phone number.

FIG. 1 is a block diagram of a personal digital assistant (e.g., handheld personal assistant) 100 according to one embodiment of the invention. The PDA 100 includes conventional PDA hardware 102 that is typically found within a PDA. The PDA hardware 102, for example, includes a processor, RAM, ROM, operating software, a display (optional), and a wireless modem (optional). The PDA 100 also includes a microphone 104, a voice recognizer 106 and a natural language processor 108. The microphone 104 receives a voice input (e.g., user query) which is supplied to the voice recognizer 106. The voice recognizer 106 delivers the voice input to the natural language processor 108. The natural language processor 108 processes the voice input to understand the voice input in a natural language context. The natural language result can then be supplied to the PDA hardware 102. This enables the voice input to be processed and thus understood using the voice recognizer 106 and the natural language processor 108. Once understood, the input can be used to direct the PDA hardware 102 to perform predetermined actions (e.g., perform an action, retrieve content, launch an application, etc.).

In another embodiment, the assistant has a receiver to receive expressions and a transmitter to transmit information to a second system. This transmission can be done in a wired or wireless manner. The expressions can be transformed into a different mode of information either by the assistant, by the second system, or a combination of the two. It would then be up to the second system to transform the expression into a different mode of information and to process the mode of information to extract, from a database, a piece of information that is personal to the person. After extraction, the second system transmits the piece of information back to the handheld personal assistant. As an example, the second system can be a server computer and the assistant can be a client computer.

Figure 2:
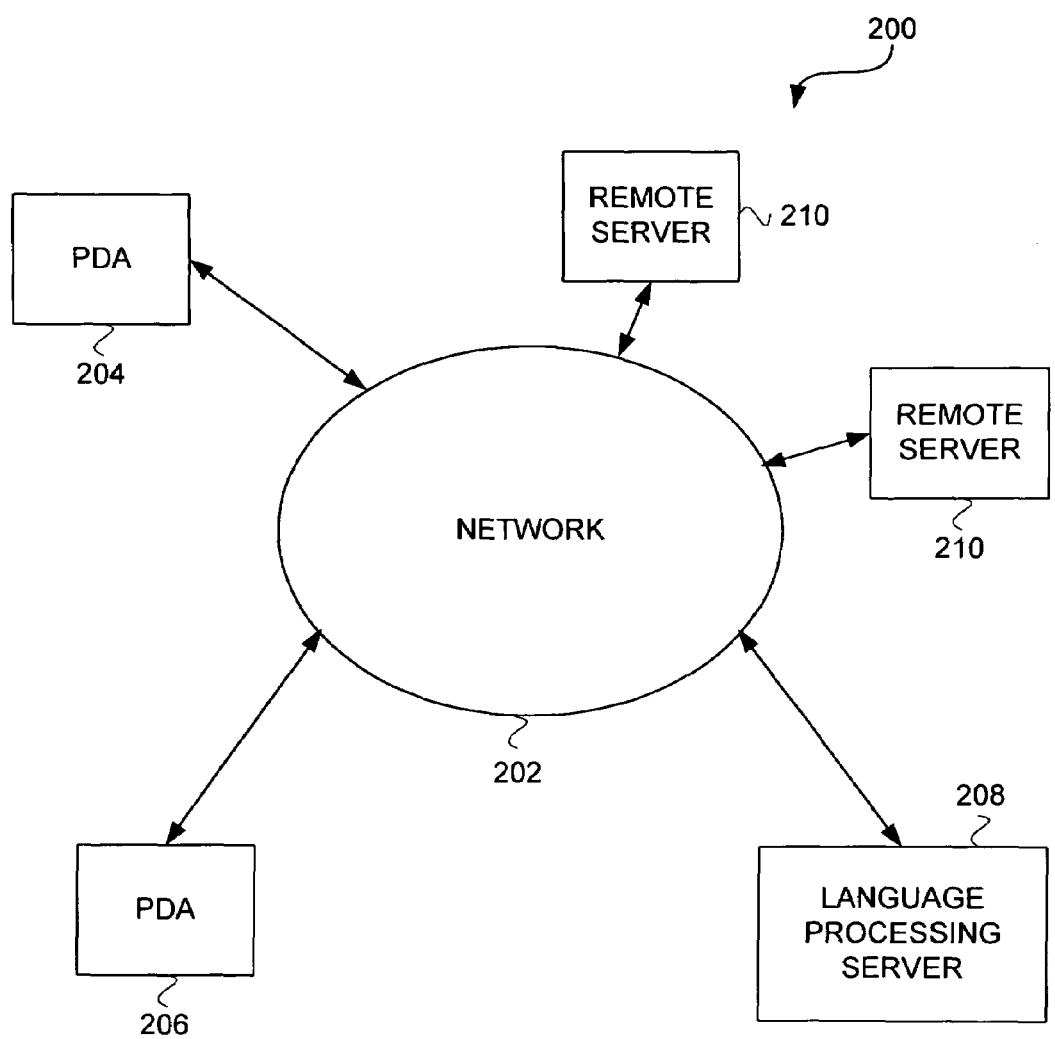
FIG. 2 illustrates a language processing system according to one embodiment of the invention.

FIG. 2 illustrates a language processing system 200 according to one embodiment of the invention. The language processing system 200 includes a network 202, PDA 204, PDA 206, and a language processing server 208. The network 202, is, for example, the Internet, a local area network or a wide area network. The PDAs 204 and 206 represent wireless handheld devices that are able to communicate with the network 202 to interact with remote servers 210, also coupled to the network 202. The language processing server 208 is one particular remote server that the PDAs 204 and 206 are able to communicate with. The language processing server 208 includes a natural language processor for processing a voice or query input received over the network 208 from one of the PDAs 204 or 206. In addition, the language processing server 208 can also include a voice recognizer.

An example of the operation of the language processing system 200 is as follows, a user of the PDA 204 can input a voice query to the PDA 204. The voice input can then be digitized and transmitted by the PDA 204 to the language processing server 208 via the network 202. Once the voice input is received at the language processing server 208, the language processing server 208 can perform processing on the voice query (e.g., voice recognition and/or natural language processing). In one embodiment, the language processing at the language processing server 208 can operate to interact with a knowledge base to understand the voice query in a natural language manner. The knowledge base can reside on the language processing server 208 or elsewhere on the network 202. After understanding the voice query, the language processing server 208 can return an indication of the meaning of the voice query to the PDA 204, such that the PDA 204 can operate in accordance with the voice query. The indication of the meaning of the voice input can cause the PDA204 to perform various predetermined actions (e.g., perform and action, retrieve content, launch and application, etc.). For example the PDA 204 can retrieve information (stored within or remotely) that is being requested by the voice query.

In one embodiment, the voice query is asking for a particular content in a natural language manner. Hence, the language processing server 208 parses the voice query to understand the natural language nature of the query and interacts with the knowledge base, thereby understanding the question. Then, a database or other content resource can be accessed to retrieve responses to the understood query. The resulting responses, possibly with other appropriate resources or content, can then be delivered through the network 202 to the PDA 204.

Additional details on natural language processing can be found in U.S. Pat. Nos. 5,934,910; 5,884,302; and 5,836,771; all of which are hereby incorporated herein by reference. Still further, additional details on natural language processing can be found in U.S. application Ser. No. 09/387,932, filed Sep. 1, 1999, (now U.S. Pat. No. 6,498,921) and U.S. application Ser. No. 09/496,863, filed Feb. 2, 2000, (now U.S. Pat. No. 6,571,240) both of which are hereby incorporated herein by reference.

The examples given so far have used handheld personal digital assistant (PDA) devices as the example platform. This invention applies to PDAs, "smart" cellular phones, internet appliances, and other devices with limited input capabilities. The natural language processing can also be extended beyond voice input to other forms of input, such as Optical Character Recognition (OCR) for scanned or faxed input. An another embodiment, the present invention is also applicable to voice inputs or OCR inputs for desktop computers.

The invention can be implemented in software and/or hardware. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A handheld personal assistant operated by a user comprising:
    a categorizer configured to store a plurality of data items in a database organized by categories of information that are grouped into a calendar category, an address book category and a to-do-list category wherein each category of information includes one or more subcategories of information that are linked in a hierarchical structure;
    a voice-recognizer configured to recognize the user's voice and transform an expression input by the user into a different mode of information;
    a context processor configured to determine the category of information corresponding to the expression input by the user, based on a first inferred context of the expression input and maintain the storage of the data items by the categorizer in the determined category of information until a new category of information is determined based upon a second inferred context; and
    a natural-language processor configured to process the mode of information to extract a piece of information from the determined category of the database;
    wherein if there is ambiguity with the mode of information to extract from a first category of information, the natural-language processor provides a first response to the user having a plurality of options, the natural-language processor then provides a second response based upon the user's selection from the options.

2. A handheld personal assistant as recited in claim 1, wherein the processor analyzes the expression grammatically and semantically to transform at least a part of the expression into at least one instruction.

3. A handheld personal assistant as recited in claim 1, wherein the piece of information is selected from the address book category, the to-do-list category and the calendar category.

4. A handheld personal assistant as recited in claim 3, wherein said personal assistant further includes a display to display the piece of information.

5. A handheld personal assistant as recited in claim 3, wherein said personal assistant further includes a voice synthesizer that transforms the piece of information into sound to communicate to the person.

6. A handheld personal assistant as recited in claim 3,
    wherein the piece of information was entered into the assistant by the user, and
    wherein the personal assistant further includes a formatting process that transforms the expression input by the user into a question with one or more phrases corresponding to the one or more categories of information, and a transformation process that converts the question into an instruction comprising a query to the database.

7. A handheld personal assistant as recited in claim 6, wherein the piece of information was entered through voice.

8. A handheld personal assistant as recited in claim 3, wherein if the assistant cannot resolve an ambiguity in the expression, the personal assistant provides the person with a number of alternatives to resolve the ambiguity.

9. A handheld personal assistant as recited in claim 2,
    wherein the personal assistant only allows the user to access the piece of information that is personal to the user if the natural-language processor recognizes of the users's voice.

10. A method for obtaining information for a requestor interacting with a handheld computing device, said method comprising:
    storing a plurality of data items in a database organized categories of information that are grouped into a calendar category, an address book category and a to-do-list category wherein each category of information includes one or more subcategories of information that are linked together in a hierarchical structure;
    receiving an input voice expression from the requestor;
    converting the input voice expression into a text string;
    processing the text string using grammatical and semantic processing to determine a natural language meaning for the text string;
    determining a category of information corresponding to the input by the requestor based on a first inferred context based on the expression input;
    extracting a piece of information from the determined category of information based upon the input voice expression;
    determining if there is an ambiguity with information extracted from the category of information;
    transmitting a plurality of choices to the requestor if an ambiguity is determined;
    resolving the ambiguity based upon the requestor's response to the plurality of choices and repeating the extracting step;
    maintaining the storing of the data items and the extracting of the piece of information in the determined category of information; and
    changing the category of information for storing the data items to a new category of information that is determined based upon a second inferred context.

11. A method as recited in claim 10, further comprising the steps of:
    transforming the input expression into a question format; and
    converting the resulting question into an instruction comprising a query to the database.

12. A method as recited in claim 11, wherein said performing further comprises:
    presenting the retrieved information to the requestor.

* * * * *